Figure 1:
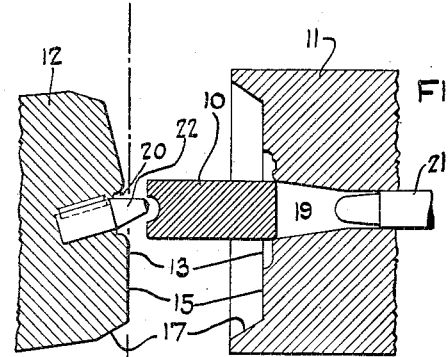

March 22, 1932.   J. W. HUGHES   1,850,395

METHOD OF MAKING INTEGRAL HUBS AND FLANGE DISKS

Filed Oct. 5, 1927

INVENTOR.
JAMES W. HUGHES.
BY
ATTORNEY.

Patented Mar. 22, 1932

1,850,395

UNITED STATES PATENT OFFICE

JAMES W. HUGHES, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

METHOD OF MAKING INTEGRAL HUBS AND FLANGE DISKS

Application filed October 5, 1927. Serial No. 224,071.

My invention consists of an integral wheel and method of making the same. It relates particularly to the method of forming integrally hubs and wheel bodies and still more particularly, to the integral forming of hubs and those relatively thin wheel bodies especially of the disk type, commonly used in automobiles as distinguished from railroad vehicles. This is an improvement in part of my application, S. N. 170,893, filed February 25, 1927.

Railroad vehicle wheels are characterized by heavy, bulky hubs, bodies and treads. The mass of metal which they contain is extremely great, since not only are the loads they are required to carry extremely great but also the addition of extra mass and body, to attain greater factors of safety, is of little moment and is commonly practiced. Automobile wheels, upon the other hand, are characterized by a much lighter construction, a light hub, and an extremely thin and lightened disk or otherwise fashioned wheel body and an equally thin rim. The disk is often tapered radially from the hub so as to further lessen the mass of metal required for a given strength and to introduce when the body is given proper form, desired resiliency. So too, are the brake drums and their hubs light. These latter are frequently formed by stamping from sheet metal of very light plate. Excessive unsprung weight in an automobile wheel is a very serious matter. It is not only detrimental to good riding qualities but is also hard on tires and expensive. So greatly do the characteristics and requirements of automobile wheels differ from those of railroad vehicle wheels that railroad wheels could never be made to serve as automobile wheels nor can the relatively light, thin and resilient automobile wheels be produced by the same methods used to produce railroad vehicle wheels.

The aims of my method are to form integrally a perfect automobile wheel, and to form it cheaply. Indeed, I aim to manufacture an integral wheel, better than the present composite constructions of wood and metal, and at less cost than such constructions.

My method has its beginning in the treatment of the raw stock. The massive hot bar is taken direct from the furnace. From this bar I get an elongated billet of substantially cylindrical cross section whose diameter is substantially that of the completed hub, and whose ratio of length to the diameter is relatively great. This billet while still hot I axially compress in rolling dies to form the ends of the hubs of the wheel and an intervened flange of relatively great thickness and mass. Thereupon without removing the hot billet from the hot dies I roll it in the same dies, roll both hub and intervening flange, to foreshorten the hub to proper dimension and to thin the flange to produce the wheel body. During this step the metal will be fed outwardly from the center as will be hereinafter more fully described. By the same rolling operation I partly turn a flange upon a wheel body adapted to serve as a brake drum, felloe, rim and the like. Finally, I remove the now formed hub and wheel body and partly turned flange from the dies and subject the partly turned flange to a die stamping operation to completely turn the same and give the product its final form.

The result in the instance of integral hubs and brake drums is a new article of manufacture, to wit, a hub and a cylindrical brake drum to coact therewith integrally connected together by a relatively thin wheel body of rolled form.

Figure 5:
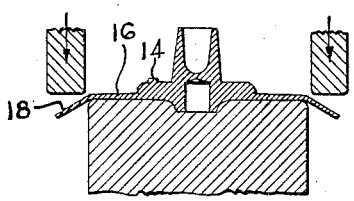
Figure 6:
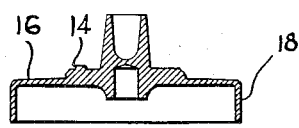
Figure 7:
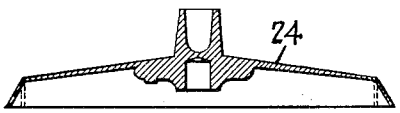

Of the drawings, Figures 1 to 5 illustrate successive steps of the method of my invention, and Figs. 6 and 7 illustrate the completed articles.

Referring first to Fig. 1 the hot billet of substantially cylindrical cross section and whose diameter is substantially that of the completed product, is designated 10. This has previously been cut from a hot bar. It may, of course, be cut from cold bars or otherwise formed and then heated to the proper temperature for ensuing operations. 11 and 12 are coacting rolling dies of the obtuse angled rolling mill type. These dies have their coacting faces configured to give the rolled article proper contour as the dies are approached under pressure and simultaneously rolled. In the instance of the integral hub and brake drum illustrated in Fig. 6 and shown as being formed in Figs. 1 to 5 the coacting portions 13 of the die faces act in rolling to form the part of the wheel body 14, commonly known as the hub flange. The coacting portions 15 roll the portion 16 commonly known as the brake drum head. The coacting portions 17 roll and partly turn the flange 18, in the case of this particular article of manufacture, the brake drum per se. But the centers of these dies 11 and 12 are respectively provided with recesses 19 and 20 adapted to form the hub ends. The recess 19 acts by direct forging on the end of the hub since there is no coacting surface on the die 12. The recess 20, however, acts jointly by forging and rolling since portions of the walls of recess 20 coact with portions of die 11 in the formation of this end of the hub. Axially movable into recess 19 and independently of the approach and recession of die 11 with respect to die 12 is a plunger 21 having an end of reduced cross section adapted to core out the inner end of the hub formed in recess 19. Fixed axially of the die 12 is a coring pin 22 adapted by rolling action to core out the end of the hub formed in recess 20. This coring out action is in rolling coaction with the adjacent walls of die 11. It will be observed that the billet 10 is elongated and substantially of the diameter of the hub portions of the wheel to be formed in recesses 19 and 20 and that the end adjoining coring pin 22 has been recessed to receive that pin while the opposite end is of such diameter that it makes a supporting entry within the recess 19.

Figure 2:
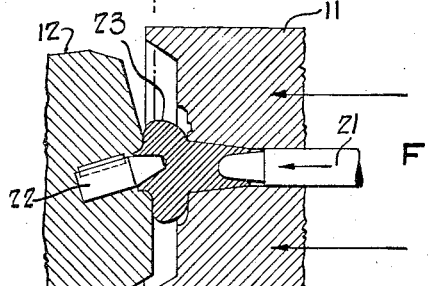
Figure 3:
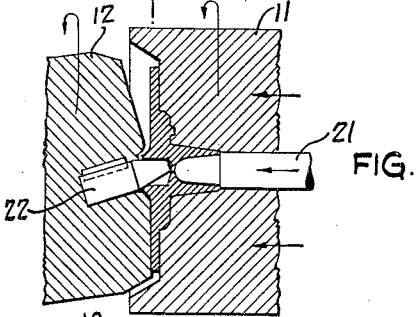
Figure 4:
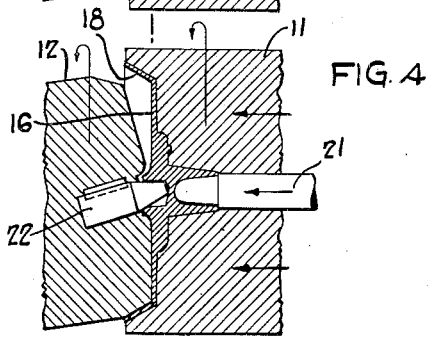

The billet 10 having been entered in the machine as shown in Fig. 1 the dies 11 and 12 are approached toward each other at first without rotation. This by a direct forging operation shapes the ends of the hub in recesses 19 and 20 and impresses the metal between the radially extending die faces into relatively large and massive rudimentary flanges 23 of a bulging form and cross section. This impressing and bulging breaks the scale entirely away from the surface of the billet with the result that the ensuing operations produce a product unmarred by the presence of scale. The scale drops freely between the still widely open dies. When this upsetting operation of Fig. 2 is substantially complete, and while maintaining the billet in the same dies and under the same heat and preferably under the same pressure which brought about the initial upsetting, the rolling operation of Fig. 3 is commenced. This rolls to face form anchoring flange 14 of the hub. This flange 14 is to receive either the disk or the brake drum as the case may be and to serve as the root of the integrally formed wheel body, brake drum head or disk body as the case may be. This early rolling operation also forms the drum head on the wheel body 16. Still further, it cores out to a still greater extent the pre-formed hub ends, the coring out of which was initiated in connection with the upsetting operation of Fig. 2. The metal of this coring out operation is extruded into the space between the now closely approached dies and is applied to constitute a part of the body of the wheel, being rolled into the already present mass of the rudimentary flange 23. Rolling is continued in this fashion until the body 16 of the wheel as shown in Fig. 4 has reached its proper thinness and taper, and until the hub is the proper length and has been fully cored out, and until the flange 18 has been partly turned by the die faces 17. Thereupon, the rolling operation is stopped. The almost finished product is removed and either immediately or after having been permitted to cool to a certain extent, placed in a die press as indicated in Fig. 5 and the flange 18 completely turned to produce the final product illustrated in Fig. 6. This is an integral wheel comprising a hub and a co-axial brake drum integrally connected together by an integrally rolled brake drum head.

The invention may be used to produce integral wheels comprising felloes or rims integrally connected with hubs by integrally rolled disk bodies 24 as illustrated in Fig. 7.

It is impossible to tell in a new art what divergencies or additions may be made as respects the original invention without departing from its generic spirit. The annexed claims must necessarily be construed in that spirit.

What I claim as new and useful is:

1. The method of making integrally hubs and thin disk bodies which consists in providing a hot billet of substantially cylindrical cross section whose diameter is substantially that of the completed hub and whose ratio of length to diameter is relatively great, axially compressing the billet in dies to form the hub ends, and an intervening flange of relatively great thickness and mass, and thereupon rolling the flange so formed to produce a wheel body, the while feeding metal from the center of the blank.

2. The method of making integrally hubs and thin disk bodies which consists in providing a hot billet of substantially cylindrical cross section whose diameter is substantially that of the completed hub and whose ratio of length to diameter is relatively great, axially compressing the billet in dies to form the hub ends, and an intervening flange of relatively great thickness and mass, and thereupon rolling the flange in the same dies to produce the wheel body, the while feeding metal from the center of the blank.

3. The method of making integrally hubs and thin flanged disk bodies which consists in providing a hot billet of substantially cylindrical cross section whose diameter is substantially that of the completed hub and whose ratio of length to the diameter is relatively great, axially compressing the billet in rolling dies to form the hub ends and, an intervening flange of relatively great thickness and mass, thereupon rolling the flange without removing the billet from the dies to produce a wheel body and partly turn the flange, the while feeding metal from the center of the blank, and finally die stamping the partly turned flange to completely turn same.

4. The method of making integrally flanged thin disk bodies which consists in first rolling the body and partly turning the flange thereon and thereafter die stamping the flange to completely turn the same.

5. The method of making integrally flanged wheel hubs which consist in first subjecting the hub and flange to rolling operations which partly turns the flange to its final location and thereafter die stamping the flange to its final location.

6. The method of making integrally hubs and wheel bodies which consists in providing a hot billet of substantially cylindrical cross section free from flanges, and whose diameter is substantially that of the completed hub and whose ratio of length to diameter is relatively great, axially compressing the billet in dies to form the hub ends, and an intervening flange of relatively great thickness and mass, and thereupon rolling the flange so formed to produce a wheel body.

7. The method of making integrally hubs and wheel bodies which consists in providing a hot billet of substantially cylindrical cross section free from flanges and whose diameter is substantially that of the completed hub and whose ratio of length to diameter is relatively great, axially compressing the billet in obtuse angle dies to form the hub ends, and an intervening flange of relatively great thickness and mass, and thereupon rolling the flange in the same dies to produce the wheel body.

8. The method of making integrally hubs and wheel bodies which consists in providing a hot billet of substantially cylindrical cross section free from flanges, and whose diameter is substantially that of the completed hub and whose ratio of length to diameter is relatively great, axially compressing the billet in obtuse angle dies to form the hub ends, and an intervening flange of relatively great thickness and mass, and thereupon rolling the flange with the billet in the same dies, and without removing it therefrom to produce the wheel body, all at the same angle of the dies.

9. The method of making integrally hubs and flanged wheel bodies which consists in providing a hot billet of substantially cylindrical cross section free from flanges, and whose diameter is substantially that of the completed hub and whose ratio of length to diameter is relatively great, axially compressing the billet in rolling dies to form the hub ends, and an intervening flange of relatively great thickness and mass, thereupon rolling the flange without removing the billet from the dies to produce a wheel body and partly turn the flange, and finally die stamping the partly turned flange to completely turn same.

In testimony whereof he hereunto affixes his signature.

JAMES W. HUGHES.